Oct. 31, 1961

N. E. HANDEL ET AL 3,006,188

MAGNETIC FLOWMETER SYSTEM

Filed Sept. 14, 1954

INVENTORS
Neil E. Handel
Stocker S. Sturgeon
BY
Curtis, Morris & Safford
ATTORNEYS

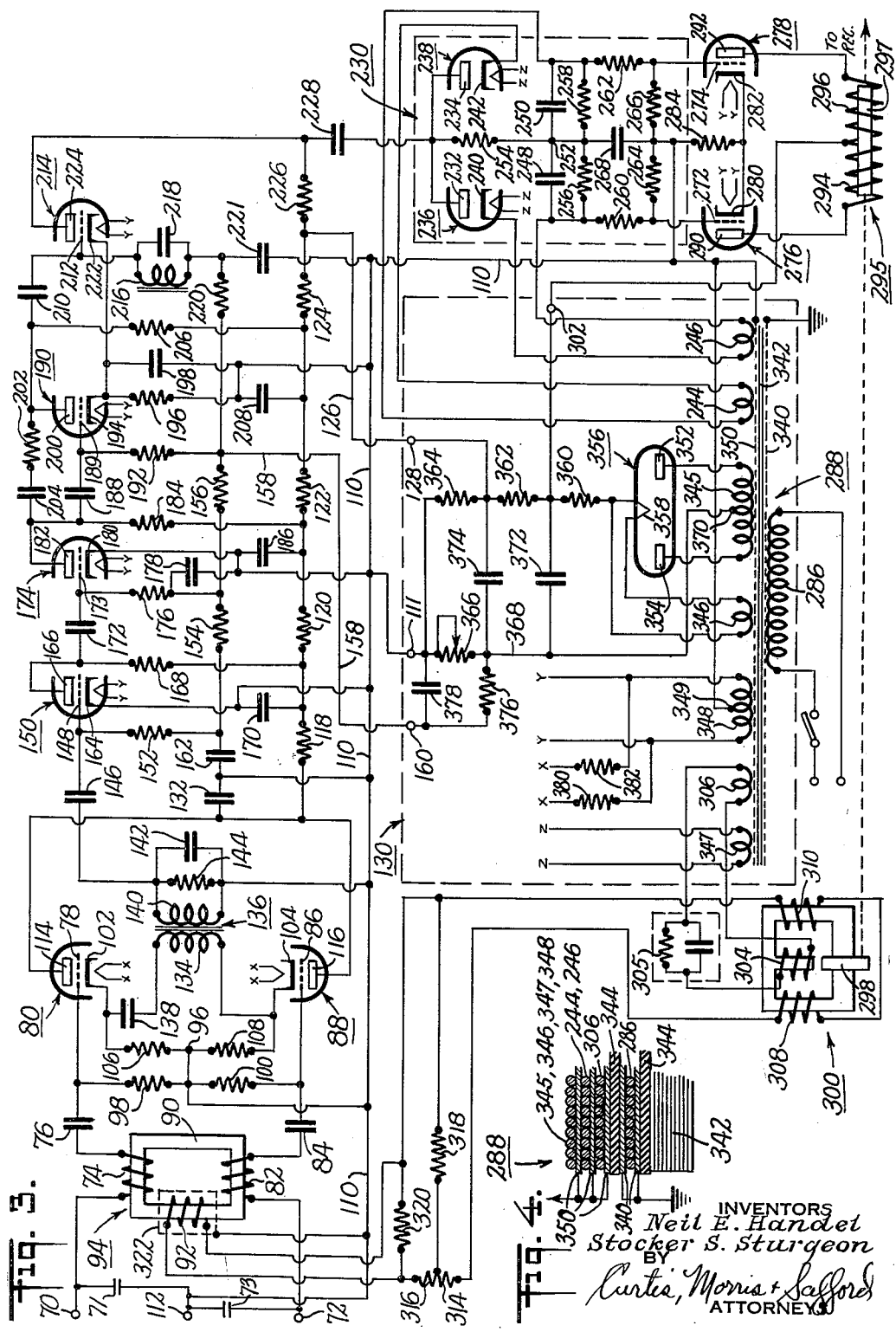

United States Patent Office

3,006,188
Patented Oct. 31, 1961

3,006,188
MAGNETIC FLOWMETER SYSTEM
Neil E. Handel, Wrentham, and Stocker S. Sturgeon, Foxboro, Mass., assignors to The Foxboro Company, Foxboro, Mass., a corporation of Massachusetts
Filed Sept. 14, 1954, Ser. No. 455,924
5 Claims. (Cl. 73—194)

This invention relates to electromagnetic flowmeters. More particularly, this invention relates to amplification apparatus for intensifying the electrical output signal of such a flowmeter.

An electromagnetic flowmeter, also commonly referred to as an induction flowmeter, typically includes a metal pipe section which carries the fluid whose flow rate is being measured, means for producing a magnetic field in the pipe transversely of the direction of fluid flow, and a pair of electrodes in contact with the fluid and positioned in the pipe on a line transverse to both the direction of magnetic flux and the direction of fluid flow. In accordance with known electromagnetic principles, movement of the fluid in the pipe generates between the electrodes a voltage the magnitude of which is a function of the rate of flow. The voltage so generated may, after amplification to a suitable power level, be used to operate one or more of a variety of recording or flow controlling devices.

Although various flowmeter designs have been suggested from time to time in the past, the provision of suitable means for amplifying the low-level output signal has been a continuing source of difficulty. One of the special problems with such amplifying apparatus has been stray circulating currents that pass through the amplifier circuitry. Such currents tend to generate spurious signals which appear at a relatively high level in the output circuit of the amplifier and cause undesirable instability and inaccuracy in the flow measurement. The problem has been a particularly difficult one to solve because the flowmeter output signal generated by the fluid movement is of extremely low amplitude, typically only several millivolts for maximum flow conditions.

Such circulating currents may come from various sources, for example from neighboring electrical equipment connected to the same power line, and especially from the flowmeter itself. It may be noted in this regard that the fluid in the pipe is at least somewhat conductive, and hence completes an electrical path from the amplifier input circuit to the metal pipe which in most practical installations is grounded or partially grounded at a variety of points in such a way as to set up circulating currents in the pipe. Thus, when the flowmeter has been coupled into such a system, these currents tend also to flow into the amplifier circuitry and may disturb the precise functioning of the instrument.

Accordingly, it is an object of this invention to provide amplification apparatus, for use with an induction flowmeter, that is superior to those used heretofore. It is a further object of this invention to provide such an amplifier that is stable in operation, economical to manufacture, and highly sensitive.

In an embodiment of the invention to be described hereinbelow in more detail, the low-level alternating-current output signal of the flowmeter is fed to the amplifier through a symmetrical input circuit that is balanced with respect to a chosen reference point other than the usual "ground," and the amplifier chassis and circuit components are isolated from "ground." The A.C. signal is then intensified by several stages of amplification, and is subsequently detected by a phase-sensitive rectifier which produces a direct-current signal used to drive a motor. This motor controls the magnitude of an alternating current feedback signal which is coupled, by means of separate transformer secondary windings placed in series with each flowmeter output lead, into the amplifier input circuit in such a way as to balance out the flowmeter signal. Thus, the position of the motor shaft is a measure of the flowmeter output signal, and hence the motor can be used to drive a flow recorder, controller, etc., in the usual manner.

Other objects, aspects and advantages of the present invention will be pointed out in, or apparent from, the following description of a specific embodiment thereof considered together with the accompanying drawings, in which:

FIGURE 3 is a schematic diagram of a flowmeter amplifier in accordance with the present invention; and FIGURE 4 is a schematic representation of the ground shielding arrangement for the power transformer in the amplifier of FIGURE 3.

Figure 1:
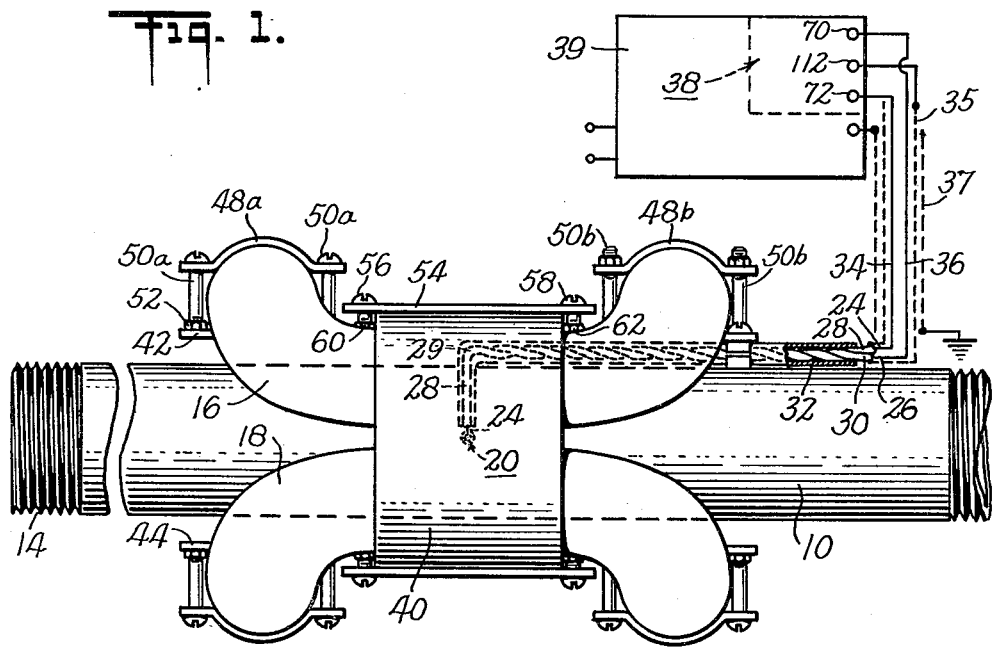
FIGURE 1 is a side elevation of a flowmeter showing generally the magnetic coils and the output lead wires.

Referring now to FIGURE 1, the fluid whose flow rate it is desired to measure passes through a section of stainless steel pipe 10, the opposite ends 12 and 14 of which are threaded so that the pipe may readily be coupled into an operating flow system (not shown). The interior wall of the pipe is normally provided with an insulating liner, advantageously formed by baking a vitreous enamel directly on the pipe inner wall, or by coating the interior surfaces with a thin layer of chemical and heat-resistant plastic.

Positioned around the pipe 10 and approximately centrally disposed between the two ends thereof, is a magnetic flux producing structure consisting of an upper coil 16 and a lower coil 18. These two coils may be identical as to shape, number of turns, size of wire, etc., and are energized by a source of alternating current (not shown), for example the usual line source of 110 volts and having a frequency of 60 cycles per second. The coils are positioned symmetrically about the pipe axis, i.e. "back-to-back," and their respective lead-in wires are connected in parallel with the source of alternating current. The coil energizing connections, furthermore, are made in such a manner that the magnetic fields produced by the coils are additive, i.e. the coils are energized in phase with each other, so that when the flux produced by one coil in the center thereof is directed upwardly, the flux produced by the other coil in the center thereof is also directed upwardly, and vice versa.

Surrounding the two coils 16 and 18 is a continuous laminated core 40, formed of any transformer iron but preferably of silicon steel, and serving as a split return path of low reluctance for the flux passing through the pipe 10. The laminations tend to reduce eddy current losses in the usual manner, and the core advantageously is potted with a suitable compound to minimize hum effects.

The core 40 and each of the coils 16 and 18 are supported by parallel bridges 42 and 44 extending longitudinally of the pipe 10 on opposite sides thereof. These two bridges are identical, and may be secured to the pipe by arch members which are welded to both the pipe and the respective bridge. Since both the upper and lower support structures are identical, the details of the upper support only will be described.

In the two places where the coil 16 passes transversely over the top of the pipe 10, it is fastened in position by curved clamps 48a and 48b which are shaped to fit snugly over the outer surfaces of the coil. Each of these clamps is secured to the bridge 42 by two bolts 50a and 50b threadedly engaged with corresponding holes extending through the bridge, the bolts being locked into position by nuts 52. Similarly, the core 40 is held in position, where it passes over the top of the pipe 10, by a flat plate 54 which is fatened to the bridge 42 by two bolts 56 and 58 threaded into holes in the bridge and locked in place by nuts 60 and 62.

The details of such a coil and core arrangement are disclosed more fully in U.S. patent application Serial No. 455,922, filed by Neil Handle et al. on September 14, 1954. It may be noted, however, that the magnetic field produced by the combination of two such coils is substantially uniform throughout the important sectional region within the pipe where the flow-responsive electromotive force is to be generated; and that the intensity of the field is essentially independent of the magnetic properties of the return path core.

Figure 2:
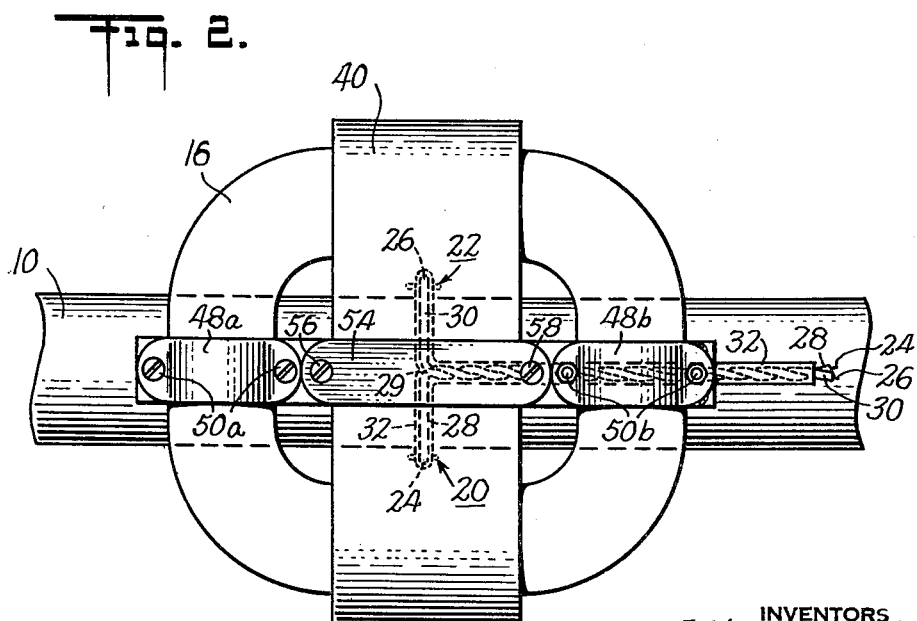
FIGURE 2 is a plan view of the flowmeter of FIGURE 1.

As shown most clearly in FIGURE 2, the flowmeter includes a pair of electrodes 20 and 22 positioned 180 degrees apart in the wall of the pipe 10. These electrodes extend through corresponding holes in the pipe wall, from which the electrodes are insulated by appropriate means (for example, as disclosed in the U.S. patent application Serial No. 455,949, filed by Stocker Sturgeon on September 14, 1954, now Patent No. 2,800,015) and make electrical contact with the fluid flowing through the pipe. The external stems of the electrodes 20 and 22 are connected respectively to output lead wires 24 and 26, which preferably are insulated with a heat-resistant plastic coating such as Teflon. These leads extend upwards through copper shield tubes 28 and 30 which are joined together at 29, for example by soldering at the center top of the pipe to form a "saddle" around the pipe 10 in a plane generally perpendicular to the pipe axis.

From their juncture, the shield tubes and the leads therein extend to the right along the top, and parallel to the axis, of the pipe 10, and are twisted together to increase their structural rigidity as well as to reduce inductive pick-up from the flowmeter coils and from neighboring electrical equipment. The shield tubes also advantageously are encased in an insulating sheath 32 which may be formed of a fiberglass-silicone composition, and which preferably covers the copper tubes down to a point adjacent the electrodes.

At their right hand ends, the wires 24 and 26 are connected, through leads diagrammatically shown at 34 and 36 (see FIGURE 1), to two input terminlas 70 and 72 of an electronic amplifier (more fully described hereinbelow) generally indicated as block 38, and which may be mounted in an instrument case generally indicated at 39. The copper shield tubes 28 and 30 are connected to a shield 35 surrounding the leads 34 and 36 and which in turn is connected to the chassis of the amplifier 38 through a terminal 112. Surrounding the latter shield 35 is still another shield 37, which is connected at one end to ground, for example the flowmeter pipe 10, and at its other end to the instrument case 39 in which the amplifier chassis is mounted.

Referring now to the upper left hand portion of FIGURE 3, which shows schematically the amplifier indicated by block 38 in FIGURE 1, the alternating-current output signal from the flowmeter head enters the amplifier input circuit through two terminals 70 and 72. One of these terminals 70 is connected through a winding 74 and a coupling capacitor 76 to the grid 78 of a triode tube generally indicated at 80. The other terminal 72 is similarly connected through a winding 82 and a coupling capacitor 84 to the grid 86 of a triode tube generally indicated at 88.

The two input circuit windings 74 and 82 are indentical and are wound on a common magnetic core 90, which may for example be toroidal in shape and is preferably of "humbuck" contruction (i.e. the windings are arranged so that voltages induced therein by stray fields tend to cancel out). A primary winding 92 is also wound on the core 90 to form a feedback transformer generally indicated at 94. The primary winding 92 of this transformer is controllably energized in accordance with the output signal of the amplifier, as will be explained in more detail hereinbelow. The sceondary windings 74 and 82 are phased such that the signals induced in each by the primary winding 92 are additive with respect to the amplifier input circuit, and the feedback link is arranged such that the signals on these windings are oppositely phased with respect to the flowmeter output signal i.e. the feedback signal tends to cancel out the signal impressed across terminals 70 and 72 so as to reduce the signal coupled to the two amplifier tubes 80 and 88 nearly to zero. It may be noted that, with this arrangement, there will be essentially no current drawn from the flowmeter when the system is in balance; hence the flowmeter may be used to measure fluids of relatively low conductivity.

The two tubes 80 and 88 comprise a balanced stage of "push-pull," cathode-follower amplification, with each of the grids 78 and 86 being returned to a common junction 96 through two resistors 98 and 100 respectively, and with the cathodes 102 and 104 being returned to this same common junction through two other resistors 106 and 108 respectively. The common junction 96 is connected to a reference lead 110, which serves, in place of the usual "grounding" arrangements, to establish the base potential about which the amplifier circuitry is symmetrically balanced. The reference lead 110 is connected in turn to the amplifier chassis as well as to the neutral terminal 111 of a direct-current power supply generally indicated at 130, and through the amplifier terminal 112 to the copper shield tubes 28 and 30 surrounding the flowmeter output lead wires 24 and 26 (see FIGURES 1 and 2).

The plates 114 and 116 of the tubes 80 and 88 are connected together, and are provided with positive D.C. energizing potential through four high-voltage isolation resistors 118, 120, 122, 124 and a high-voltage lead 126 which is connected to one terminal 128 of the direct-current power supply 130. A decoupling capacitor 132 is connected between the plates 114 and 116 and the reference lead 110 to minimize fluctuations in the plate supply potential.

The cathodes 102 and 104 of these tubes 80 and 88 are also connected together through the primary winding 134 of a transformer generally indicated at 136, in series with a capacitor 138 which serves to block the flow of direct current through the winding. The A.C. signal flowing through the primary winding 134 is representative of the "difference" between the flowmeter output signal and the feedback signal coupled into the input circuit through the transformer 94. This amplified difference signal is inductively coupled to the secondary winding 140 of the transformer, which is connected in parallel with a tuning capacitor 142 and a loading resistor 144. One end of the secondary winding 140 is connected to the reference lead 110, while the other end is coupled through a capacitor 146 to the grid 148 of a triode tube generally indicated at 150.

This grid 148 is also connected to one end of a resistor 152, the remote end of which is connected through two isolation resistors 154 and 156 and a bias voltage lead 158 to the negative low-voltage terminal 160 of the power supply 130. The bias voltage thereby supplied to the grid 148 may be, for example, about 1½ volts, and serves to reduce hum resulting from cathode-to-filament coupling. The remote end of this resistor 152 is also connected through a capacitor 162 to the reference lead 110, to minimize fluctuations in the grid bias voltage.

The cathode 164 of this tube 150 is connected directly to the reference lead 110, and the plate 166 is supplied with positive operating potential through a load resistor 168 which is connected to the junction of the first two high-voltage isolation resistors 118 and 120. A capacitor 170 is connected between this junction and the reference lead 110 to minimize fluctuations in the voltage supplied to the plate 166.

The alternating difference signal on the plate 166 is coupled through a capacitor 172 to the grid 173 of a triode tube generally indicated at 174, and which comprises the third stage of amplification. As in the previous stage of amplification, the grid of this tube is given a small negative bias through a resistor 176, which is connected to the junction between the grid bias isolation resistors 154 and 156; this junction is also connected through a decoupling capacitor 178 to the reference lead 110 to minimize fluctuations in the potential supplied. It is desirable that the grid resistor 176 and the coupling capacitor 172 be of such values as to produce a minimum phase shift of the alternating difference signal, and this is true of the corresponding elements (resistor 152 and capacitor 146) used in the previous stage of amplification.

The cathode 180 of the triode tube 174 is connected directly to the reference lead 110, and the plate 182 of this tube is supplied with positive energizing potential through a load resistor 184, which is connected to the junction of the second and third high-voltage isolation resistors 120 and 122. This junction is also connected to the reference lead 110 by a decoupling capacitor 186 to minimize fluctuations in the voltage supplied to the plate 182.

The amplified difference signal on the plate 182 is coupled through a capacitor 188 to the grid 189 of a triode tube generally indicated at 190. This grid 189 is provided with a small negative bias through a resistor 192 which is connected directly to the bias voltage lead 158. The cathode 194 of this tube 190 is connected through a small cathode resistor 196 in parallel with a by-pass capacitor 198 to the reference lead 110. The plate 200 of this tube is connected through a resistor 202 and a capacitor 204, in series, to the plate 182 of the preceding tube, to provide a small amount of feedback for controlling the amplifier gain. Positive operating potential is supplied to the plate 200 through a load resistor 206, which is connected at its remote end to the junction of the third and fourth high-voltage isolation resistors 122 and 124. This junction is also connected through a decoupling capacitor 208 to the reference lead 110, to minimize fluctuations in the supply voltage.

The plate 200 of the tube 190 is also coupled through a capacitor 210 to the grid 212 of a tube generally indicated at 214, and which comprises the fifth stage of amplification. The grid 212 of this tube is provided with a small negative bias through a tuned tank circuit composed of an inductor 216 in parallel with a capacitor 218, the remote ends of which are connected through an isolation resistor 220 to the bias voltage lead 158, and through a decoupling capacitor 221 to the reference lead 110. This tank circuit is tuned approximately to the frequency of the alternating intelligence signal (typically 60 c.p.s.), but is slightly mistuned to introduce a phaseshift in the difference signal to assure proper operation of the phase-sensitive rectifier as described below. The cathode 222 of this tube 214 is connected directly to the cathode 194 of the preceding tube 190, and the plate 224 is supplied with positive energizing potential through a load resistor 226 which is connected directly to the high-voltage lead 126.

The relatively high-level alternating difference signal on the plate 224 of the latter tube 214 is coupled through a capacitor 228 to a balanced phase-sensitive rectifier, generally indicated at 230, which converts this signal to a direct-current signal having a polarity determined by the phase of the difference signal. For this purpose, the lower plate of the capacitor 228 is connected to the anodes 232 and 234 of two half-wave rectifiers generally indicated at 236 and 238, the cathodes 240 and 242 of which are connected together through two secondary windings 244 and 246 and two filter capacitors 248 and 250, all in series. The common junction 252 of the filter capacitors is connected to back to the rectifier anodes through a resistor 254. Bridged across each of the filter capacitors is a corresponding load resistor 256 and 258, the remote ends of which are connected together through two filter resistors 260 and 262 and two output resistors 264 and 266, all in series. The junction of the output resistors is connected directly to the reference lead 110, and through a filter capacitor 268 to the common junction 252.

The direct-current signal developed in the output circuit of the phase-sensitive rectifier 230 is fed to a pair of power amplifier tubes generally indicated at 276 and 278 in order to produce a signal of sufficient strength to operate a feedback drive motor, as will be described. For this purpose, the remote ends of the output resistors 264 and 266 are connected, respectively, to the grids 272 and 274 of these two power amplifier tubes. The cathodes 280 and 282 of these tubes are connected together and also are connected through a small resistor 284 back to the junction of the output resistors 264 and 266.

The secondary windings 244 and 246, forming part of the phase-sensitive rectifier 230, are inductively coupled to the primary winding 286 of a power transformer generally indicated at 288, and connected in parallel with the power excitation source of the flowmeter magnet coils 16 and 18, and produce alternating voltages of power line frequency that are equal in amplitude and oppositely phased with respect to the half-wave rectifiers 236 and 238. When there is no difference signal coupled through the capacitor 228, each rectifier will pass an equal amount of current, and consequently the direct-current voltage appearing across the output resistors 264 and 266 will be equal and of opposite polarity. Hence, the total direct-current voltage between the remote ends of these output resistors will, under these conditions, be zero.

However, when a difference signal is impressed on the coupling capacitor 228, one of the half-wave rectifiers 236 and 238 will conduct more heavily than the other. This is because the difference signal is arranged, as by means of the tuned circuit 216 and 218 referred to previously, to be in phase with the signal produced by one of the secondary windings 244 and 246, and, correspondingly, 180 degrees out of phase with the signal produced by the other secondary winding. That is, since the phase comparison voltages produced by the secondary windings are out of phase with each other, these voltages in effect "gate" the rectifiers by placing them alternately in conductive condition for one half-cycle at a time. Thus, the "positive" half-cycle of difference signal, i.e. the half-cycle that tends to cause conduction through both of the rectifiers, is permitted to pass through the rectifier that is "gated" conductive during that half-cycle, but is blocked from passing through the other rectifier.

Hence, the amplified diffference signal will pass predominately through only one rectifier, the signal path being completed through one of the filter resistors 260 and 262, through a corresponding one of the output resistors 264 and 266 and back to the reference lead 110. When the phase of the difference signal reverses, e.g. due to a change in flow rate through the pipe 10, the signal will pass through the other rectifier and the other output resistor. Because in either case one of the output resistors 264 or 266 carries more current than the other, there will be a corresponding direct-current voltage between the remote ends of these resistors, the polarity of which is determined by the phase of the difference signal, and this voltage serves as the input signal on the grids 272 and 274 of the balanced power amplifier tubes 276 and 278 referred to previously.

The plates 290 and 292 of these tubes are connected together through two coils 294 and 296 of an inductive positioning motor generally indicated at 295, the shaft 297 of which is mechanically linked to the movable element 298 of a "differential transformer" generally indicated at 300. The motor 295 may be any one of a variety of devices having suitable response characteristics, and preferably is a balanced-solenoid type of motor such as described in U.S. Patent No. 2,639,007, issued on March 3, 1953, to W. H. Howe et al. The junction between the motor coils 294 and 296 is connected to a high-voltage terminal 302 of the power supply 130, in order to provide positive energizing potential for the tubes 276 and 278.

The differential transformer 300 includes an energizing winding 304, which is connected through a phase-shifting resistor 305 to a secondary winding 306 of the power transformer 288, and two series-connected output windings 308 and 310 which are inductively coupled to the energizing winding. The amount of coupling to each output winding is determined by the position of the movable element 298. That is, when the movable element is centrally located between the output windings, the voltages induced in each will be equal but of opposite phase so that the total voltage across the two output windings will be zero. As the movable element is moved away from the position of balance, the total output voltage varies proportional to the amount of motion, and the phase is determined by the direction of motion (i.e. right or left) of the movable element away from the position of balance. The general principles of construction and operation of such devices are more fully described in U.S. Patent No. 2,207,248, issued to Garlick on July 9, 1940, and in U.S. Patent No. 2,631,272, issued to Graydon Smith on March 10, 1953. Advantageously, the windings are individually shielded, e.g. by shields connected to the reference lead 110, and the linkage mechanism controlled by the motor shaft 287 may be non-conductive to further reduce the effects of ground potentials.

One output winding 308 is connected through two series resistors 314 and 316 to one end of the primary winding 92 of the balanced transformer 94 in the amplifier input circuit. The other output winding 310 is connected directly to the opposite end of the primary winding 92, and is also connected through a temperature-sensitive resistor 318 (e.g. formed of a nickel composition) to the junction of the series resistors 314 and 316. Bridged across the leads connected to the primary windings 92 is a fourth resistor 320.

These four resistors 314, 316, 318 and 320 constitute a temperature-compensating and calibrating network. By proper choice of the various component values, the amplifier output can be made essentially independent of changes in output voltage of the differential transformer 300 that are caused by temperature variations; the amplifier sensitivity can also thus be set at the proper value to operate with a particular flow recorder or controller. Typical values for these resistors are: $R_{314}=100$ ohms; $R_{316}=200$ ohms; $R_{318}=200$ ohms (at 70° F.); $R_{320}=50$ ohms.

The primary winding 92 is individually shielded by a shield 322 which is connected to the reference lead 110, to isolate the differential transformer 300 from the ground potentials on the input circuit windings 74 and 82.

The overall operation of the amplifier is as follows: The alternating-current (typically 60 c.p.s.) flowmeter output signal connected to the amplifier input terminals 70 and 72 is combined with the feedback signal on the secondary windings 74 and 82, and the resultant difference signal is fed to the grids of two amplifier tubes 80 and 88 that are balanced for circuit symmetry about the reference lead 110. This reference lead is electrically isolated from "ground" (i.e. the amplifier chassis is insulated from the instrument case), and is connected to the flowmeter output lead shield tubes 28 and 30 through the amplifier terminal 112. The difference signal is intensified by several stages of amplification, and is detected in the phase-sensitive rectifier 230 to provide a direct-current signal having a polarity determined by the phase of the difference signal relative to the line voltage. This direct-current signal is further amplified and is fed to a drive motor 295 which controls the magnitude and phase of the alternating-current feedback signal produced by the differential transformer 300 and injected into the amplifier input circuit through the feedback transformer 94. The feedback signal is split by means of the two input circuit secondary windings 74 and 82 into two equal components which are balanced symmetrically about the reference lead 110, and which are phased so as to tend to cancel out the flow signal impressed across the amplifier input terminals 70 and 72.

When the flowmeter output signal increases, the phase of the difference signal will be such as to move the drive motor shaft in a direction to increase the amount of feedback and to rebalance the system with essentially no voltage in the amplifier input circuit. If the flowmeter signal decreases, the phase of the difference signal will be reversed, and the drive motor shaft will move in the opposite direction to decrease the amount of feedback and again rebalance the system. Thus, the position of the drive motor, which also may be used to control the usual flow recorder, controller, etc., will be an accurate measure of the magnitude of the flowmeter output signal.

Experience has shown that, even with the fully ground-isolated amplifier arrangement described above, there may still be, with certain flowmeter head arrangements, some alternating pick-up signals fed to the amplifier input circuit. It has been found that such background signals may be markedly reduced by connecting a capacitor 71 and 73 between each input terminal 70 and 72 and the amplifier chassis. These capacitors preferably are matched, and may be, for example, of about 0.005 microfarad. Apparently, the capacitors serve to overload the source of pick-up signals (which may have an effective internal impedance of several hundred megohms) without overloading the intelligence signal generated by the flowmeter (which typically has a relatively lower internal impedance of around 100,000 ohms).

Moreover, it has been found that such background signals can be reduced effectively to zero, for all practical purposes, by connecting the flowmeter lead shield tubes 28 and 30 directly to the pipe 10, and especially when the connection is made at a point lying in a longitudinal vertical plane (referring to FIGURE 1 of the drawings) passing through the pipe. For example, the junction point 29 of the shield tubes (i.e. at the top of the saddle portion) may be connected directly to the bridge 42. Such a connection apparently establishes the shield tubes at a fixed, non-floating potential so as to prevent the lead shield structure from coupling unbalanced pick-up signals to the amplifier input circuit. Further, when the connection is made at a point lying in a plane which bisects the pipe symmetrically with respect to the contact electrodes, this fixed potential will be established at about mid-way between the electrode potentials and thereby assure a nearly perfect balancing-out of any pick-up signals. It should be noted that, with such an arrangement, the amplifier chassis will still be effectively isolated from the effects of circulating ground currents; that is, there are no conductive loops through the amplifier components, since the chassis is fully insulated from the instrument case or equivalent structure.

Since the flowmeter output signal on the amplifier input terminals 70 and 72 will typically be shifted in phase by approximately 90 degrees with respect to the alternating-current supply line voltage, the feedback signal produced by the differential transformer 300 should be shifted in phase by a like amount with respect to the supply line voltage. This is accomplished by the phase-shift resistor-capacitor network 305, placed in series with the differential transformer energizing winding 304, and which, together with the normal inductance of the energizing winding, produces the desired phase shift. Typically, the resistor in network 305 may have a resistance of between 500 to 1000 ohms, and the capacitor between .5 and 1.5 microfarads.

The power transformer 288 in the amplifier power supply 130 includes a novel shielding arrangement adapted to assure that the amplifier circuitry is isolated from "ground." Referring now to FIGURE 4, which is a schematic representation of the transformer winding arrangement, the primary winding 286 is surrounded on both sides by a shield structure 340 which is connected to "actual" ground, e.g. the flow recorder instrument case. As usual, the primary winding is wound about a magnetic core 342 with layers of insulation 344 positioned adjacent the outer surfaces of the primary shield structure 340.

Interleaved between the various transformer secondary windings (244, 246, 345, 346, 347, 348) is a separate shield structure 350, electrically isolated from the primary winding shield 340 and connected to the reference lead 110. This separate shield provides additional protection for the secondary windings, as well as the amplifier circuitry connected thereto, from the effects of ground potential variations in the power supply line due to neighboring electrical equipment, etc.

Returning now to FIGURE 3, and with particular reference to the power supply 130, the two ends of one of the power transformer secondary winding 345 are connected to the respective anodes 352 and 354 of a full-wave rectifier tube generally indicated at 356. The filament 358 of this tube is energized by another transformer secondary winding 346, and is connected to a voltage dividing and direct-current load network including three resistors 360, 362, and 364 and a potentiometer 366, all in series, the electrical path for the rectifier current being completed back through a lead 368 to the center tap 370 of the secondary winding 345. A filter capacitor 372 is connected between the lead 368 and the junction of the first two resistors 360 and 362, which junction in turn is connected to the power supply high-voltage output terminal 302. A second filter capacitor 374 is connected between this lead 368 and the junction of the second two resistors 362 and 364, which junction in turn is connected to the other high-voltage output terminal 128.

The junction between the third resistor 364 and the potentiometer 366 is connected to the "neutral" output terminal 111, and from there to the reference lead 110 as previously described. The negative bias output terminal 160 of the power supply 130 is connected to the lead 368 through a resistor 376, and to the neutral output terminal 111 through a filter capacitor 378; the magnitude of the bias voltage is determined by the setting of the potentiometer 366.

The heater filaments z—z of the phase-sensitive rectifier tubes 236 and 238 are supplied with current from a separate transformer secondary winding 347. The heater filaments of the tubes 80 and 88 forming the first stage of amplification are supplied with current from another transformer secondary winding 348 through two small dropping resistors 380 and 382; these resistors reduce the voltage applied to the filaments (e.g. from the usual 6.3 volts to about 4.7 volts), and minimize any possible A.C. hum effects. The remainder of the tube heater filaments y—y are supplied with current directly from the latter secondary winding 348, the center tap 349 of which is connected to the reference lead 110.

Accordingly, it will be apparent that the apparatus hereinabove described is capable of achieving the several objects of the invention, and especially is adapted to amplify accurately the low-level output signal of an alternating-current induction flowmeter without instability or other undesirable effects. Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

We claim:

1. Signal amplification apparatus for use with alternating-current induction flowmeters of the type including a fluid flow pipe having two electrodes disposed on opposite sides of said pipe and in electrical contact with the fluid within said pipe to produce an A.-C. flow signal, said apparatus comprising, in combination, an amplifier having a balanced input circuit including first and second terminals and a common neutral terminal, said input circuit being balanced about said common neutral terminal, first and second signal transmission means for coupling said first and second input terminals respectively to correspondingly ones of the flowmeter electrodes, a reference lead comprising shield means surrounding said first and second signal transmission means and connected to said common neutral terminal to maintain that terminal at a reference potential equal to the potential of the fluid within said pipe, case means for said amplifier to provide shielding therefor, said common neutral input terminal being electrically insulated in said amplifier from said case means, by-pass circuit means comprising second shield means surrounding said first shield means and connecting said case means to the fluid in said flow pipe, and feedback means coupled between the output of said amplifier and said input circuit, said feedback means including circuit means for developing an A.-C. feedback signal that opposes and tends to equal the A.-C. flow signal fed by said transmission means to said input terminals.

2. Signal amplification apparatus for use with alternating-current induction flowmeters of the type including a fluid flow pipe having two electrodes disposed on opposite sides of said pipe and in electrical contact with the fluid within said pipe to produce an A.-C. flow signal, said apparatus comprising, in combination, an amplifier having a balanced input circuit including first and second terminals and a common neutral terminal, said input circuit being balanced about said common neutral terminal, first and second signal transmission means for coupling said first and second input terminals respectively to corresponding ones of the flowmeter electrodes, a reference lead comprising shield means surrounding said first and second signal transmission means and connected to said common neutral terminal to maintain that terminal at a reference potential equal to the potential of the fluid within said pipe, case means for said amplifier to provide shielding therefor, said common neutral input terminal being electrically insulated in said amplifier from said case means, by-pass circuit means comprising an electrically-conductive element connecting said case means to the fluid in said flow pipe; A.-C. power supply means for said amplifier, a transformer for said A.-C. power supply means and including primary and secondary winding means, said primary winding means being adapted to be energized by a source of alternating current external to said amplifier case means, first and second electrostatic shields between said primary and secondary winding means, said first shield being connected to said common neutral terminal, said second shield being connected to said by-pass circuit means; and feedback means coupled between the output of said amplifier and said input circuit, said feedback means including circuit means for developing an A.-C. feedback signal that opposes and tends to equal the A.-C. flow signal fed by said transmission means to said input terminals.

3. Signal amplification apparatus for use with alternating-current induction flowmeters of the type including a flow pipe having two electrodes disposed on opposite sides of said pipe and in electrical contact with the fluid within said pipe to produce an A.-C. flow signal, said apparatus comprising, in combination, an amplifier having a balanced input circuit including first and second input terminals and a common neutral terminal, said input circuit being balanced about said common neutral terminal, first and second lead wires connected to said flowmeter electrodes respectively for coupling each of said electrodes to a corresponding one of said first and second input terminals, a reference lead connected to said common neutral terminal to maintain that terminal at a reference potential that is effectively equal to the potential of the fluid within said pipe, and feedback means coupled between the output of said amplifier and said input circuit, said feedback means including circuit means for developing a pair of essentially equal feedback signals and for coupling each of said feedback signals respectively to one of said lead wires in series-opposition to the flow signal therein.

4. Apparatus as claimed in claim 3, wherein the first stage of said amplifier consists of a pair of current-control devices arranged as a push-pull amplifying circuit, said current-control devices having respective control electrodes each coupled to a corresponding one of said signal input terminals, and coupling means for coupling each of said balanced feedback signals between a respective one of said lead wires and the corresponding one of said signal input terminals.

5. Apparatus as claimed in claim 4, wherein said coupling means comprises a transformer having a primary winding and two secondary windings, each of said secondary windings being connected between one of said lead wires and the corresponding one of said signal input terminals, said primary winding being energized by said feedback means.

References Cited in the file of this patent

UNITED STATES PATENTS

| | | |
|---|---|---|
| 2,170,048 | Dunning et al. | Aug. 22, 1939 |
| 2,685,796 | Romanowski et al. | Aug. 10, 1954 |
| 2,696,737 | Mittelmann | Dec. 14, 1954 |
| 2,729,103 | Raynsford et al. | Jan. 3, 1956 |
| 2,757,538 | Soffel | Aug. 7, 1956 |

OTHER REFERENCES

Article: "An Induction Flowmeter Design Suitable for Radioactive Liquids," by W. G. James, Review of Scientific Instruments, vol. 22, No. 12, December 1951.

Article: "Improved Apparatus-Electromagnetic Determination of Blood Flow," by A. Kolin, Review of Scientific Instruments, vol. 23, No. 5, May 1952.